United States Patent
Yokota

(10) Patent No.: US 6,846,898 B2
(45) Date of Patent: Jan. 25, 2005

(54) GOLF BALL HAVING A URETHANE COVER

(75) Inventor: Masatoshi Yokota, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 0 days.

(21) Appl. No.: 10/085,078

(22) Filed: Mar. 1, 2002

(65) Prior Publication Data

US 2003/0073515 A1 Apr. 17, 2003

(30) Foreign Application Priority Data

Mar. 15, 2001 (JP) ........................................ 2001-074095

(51) Int. Cl.[7] .............................................. A63B 37/12
(52) U.S. Cl. ............................ 528/65; 528/61; 528/63; 528/64; 528/85; 473/378
(58) Field of Search .............................. 528/61, 63, 64, 528/65, 85; 473/378

(56) References Cited

U.S. PATENT DOCUMENTS

| | | |
|---|---|---|
| 3,130,102 A | 4/1964 | Watson et al. |
| 3,989,568 A | 11/1976 | Isaac |
| 4,978,691 A * | 12/1990 | Murai |
| 5,334,673 A | 8/1994 | Wu |
| 5,800,286 A * | 9/1998 | Kakiuchi |
| 5,929,189 A * | 7/1999 | Ichikawa et al. ............. 528/76 |
| 6,309,313 B1 * | 10/2001 | Peter |
| 6,392,002 B1 * | 5/2002 | Wu |
| 6,476,176 B1 * | 11/2002 | Wu ............................ 528/76 |
| 2002/0177491 A1 * | 11/2002 | Cavallaro |

* cited by examiner

Primary Examiner—David J. Buttner
(74) Attorney, Agent, or Firm—Birch, Stewart, Kolasch & Birch, LLP

(57) ABSTRACT

The invention provides an improved golf ball having a thermosetting polyurethane cover that enables the ball to maintain its ball characteristics even under a severe condition such as a rainy weather or a very hot weather under a burning sun. The golf ball has a cover made of the polyurethane prepared by curing a urethane prepolymer having an isocyanate group at a terminal thereof with a curing agent. The urethane prepolymer contains a polycarbonate polyol component having a number-average molecular weight of from 300 to 3000.

6 Claims, No Drawings

GOLF BALL HAVING A URETHANE COVER

This nonprovisional application claims priority under 35 U.S.C. §119 (a) on Patent Application No. 2001-074095 filed in Japan on Mar. 15, 2001, which is herein incorporated by reference.

BACKGROUND OF THE INVENTION

1. Field of the Invention

The present invention relates to a golf ball covered with a thermosetting polyurethane cover that enables the golf ball to maintain a high repulsion property even if the ball is left under a severe condition such as a rainy weather or a very hot weather under a burning sun.

2. Description of the Related Art

Ionomer resin covers are mainly used for golf ball covers because they have superior durability. Golf balls with such ionomer resin covers, however, give golfers a larger impact upon a shot than golf balls with Balata covers and hence are likely to impart the golfers with an inferior shot feeling.

In attempt to improve the shot feeling imparted by golf balls with ionomer covers, Japanese Patent No. 2709950, for example, proposes a mixed ionomer cover. The mixed ionomer is a mixture of a hard ionomer comprising sodium salt or zinc salt of an olefin-unsaturated carboxylic acid copolymer and a soft ionomer comprising sodium salt or zinc salt of an olefin-unsaturated carboxylic acid-unsaturated carboxylate terpolymer. The mixed ionomer cover makes a golf ball possible to render the shot feeling soft, but impairs the merits inherent to ionomer covers; for example, the repulsion property as well as the scuff resistance (or chunking property) of the golf ball upon a shot lowers.

In recent years, polyurethane is receiving attention as an inexpensive cover material that imparts to golfers a shot feeling analogous to that imparted by the Balata cover and has higher durability than the Balata cover. Japanese Patent No. 2662909, for example, discloses a polyurethane cover formed by curing a urethane prepolymer with a slow-reactive polyamine curing agent.

Japanese Patent No. 2662909 teaches a urethane prepolymer obtained by reacting a polyol such as polyether polyol, polyester polyol or polylactone polyol with a diisocyanate such as 4,4'-diphenylmethane diisocyanate (MDI), 3,3'-dimethyl-4,4'-biphenylene diisocyanate (TODI).

Generally, the soft segment of a polyurethane resin largely influences the performance of the polyurethane resin. The component serving as the soft segment of polyurethane is a polyol forming a urethane prepolymer. The Japanese Patent, however, is completely silent on the relation between a polyol and a polyurethane cover formed using the polyol or a golf ball with the polyurethane cover. Meanwhile, it is likely that golf balls, which are observed to have not so large a difference in performance therebetween when they are each in a brand-new state, come to exhibit a considerable difference in performance therebetween if they are left under a severe condition such as a rainy weather or a very hot weather under a burning sun.

SUMMARY OF THE INVENTION

It is an object of the present invention to provide a golf ball having a thermosetting polyurethane cover that enables the ball to maintain its ball characteristics even under a severe condition such as a rainy weather or a very hot weather under a burning sun.

A golf ball of the present invention comprises a core and a polyurethane cover covering the core. The polyurethane cover is formed by curing a urethane prepolymer having an isocyanate group at a terminal thereof with a curing agent. The urethane prepolymer contains a polycarbonate polyol component having a number-average molecular weight of from 300 to 3000.

The foregoing and other objects, features and attendant advantages of the present invention will become apparent from the reading of the following detailed description.

DETAILED DESCRIPTION OF THE PREFERRED EMBODIMENTS

The present invention will now be described in detail.

The golf ball of the present invention is characterized by being covered with a polyurethane cover that is formed using a urethane prepolymer containing a specific polyol component.

Description is directed first to the polyurethane cover used in the present invention. The polyurethane forming into a cover prepared by curing a urethane prepolymer having an isocyanate group at a terminal thereof (hereinafter referred to as "isocyanate group-terminated urethane prepolymer") resulting from the reaction between a polycarbonate polyol and an isocyanate with use of a curing agent.

The use of a polycarbonate as a polyol component that forms the soft segment of the resulting polyurethane makes it possible to provide a golf ball that is less susceptible to changes in its characteristics even under a severe environmental condition such as a rainy weather or a very hot weather under a burning sun and hence exhibits superior durability. As the linearity and symmetry of the molecular chain of a polyol forming a urethane prepolymer become greater, the polyol is easier to crystallize and, hence, a cover formed from such a urethane prepolymer exhibits higher repulsion property and durability. A golf ball manufactured using a polyether polyol or polyester polyol having high crystallinity exhibits a superior repulsion property when it is in a brand-new state. However, since ester bonds of polyester polyol or ether bonds of polyether polyol are likely to decompose due to heat or hydrolyze, the macropolyol in the polyurethane forming the cover of the ball decomposes to lower the crystallinity thereof when the ball is left under a severe condition such as a rainy weather or a very hot weather under a burning sun and, hence, the golf ball exhibits lowered physical properties under such a condition. A golf ball manufactured using a polycarbonate polyol, on the other hand, is capable of maintaining a superior repulsion property in a brand-new state for a long time because the carbonate bond of the polycarbonate polyol is less susceptible to hydrolysis or thermal decomposition than the ether bond of polyether polyol or ester bond of polyester polyol.

Such a polycarbonate polyol for use in the present invention has a number-average molecular weight of not less than 300, preferably not less than 900, more preferably not less than 1600. The upper limit of the number-average molecular weight of the polycarbonate polyol is 3000, preferably 2900. If the number-average molecular weight of the polycarbonate polyol is less than 300, the soft segment of the resulting polyurethane is relatively small and, hence, a golf ball with a cover formed of the polyurethane exhibits an insufficient repulsion property even when it is in a brand-new state. Further, such a small soft segment makes the resulting polyurethane too hard, thereby providing a golf ball that imparts a poor shot feeling to golfers and exhibits inferior controllability. If the number-average molecular weight of the polycarbonate polyol is more than 3000, the polycarbonate polyol has such a high viscosity as to lower the workability thereof in mixing and reaction with a diisocyanate or the like. Further, the melting point of the polycarbonate polyol becomes higher with increasing molecular weight. Therefore, the molding of a cover, during which the reaction between the urethane prepolymer and the curing agent proceeds, needs to be performed at a higher temperature. The curing reaction at such a high temperature proceeds too rapidly and, hence, the cover composition exhibits lowered workability. In addition, molding at such a high temperature causes the rubber core of an intended golf ball to deteriorate.

The term "number-average molecular weight", as used in the present invention, is a polystyrene-converted value measured by gel permeation chromatography (GPC).

The polycarbonate polyol may be any diol represented by the general formula: HO—(ROCO)$_n$—ROH but is preferably poly(hexamethylene carbonate) of which R is represented by the following formula (1) or poly(1,4-cyclohexanedimethylene carbonate) of which R is represented by the following formula (2). Poly (hexamethylene carbonate) and poly (1,4-cyclohexanedimethylene carbonate) are preferable because they are excellent in heat resistance, resistance to hydrolysis and weatherability.

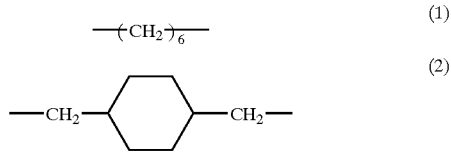

The polyol used as a raw material of the isocyanate-group terminated urethane prepolymer may comprise any polyol other than the polycarbonate polyol as long as the amount thereof to be used is less than 45% by mass based on the total amount of the used polyol. According to the preferable embodiment of the present invention, the only polycarbonate polyol is substantially used as a polyol component of the urethane prepolymer.

Examples of usable polyols other than the polycarbonate polyol include low-molecular-weight diols such as ethylene glycol, diethylene glycol, triethylene glycol, 1,3-butanediol, 1,4-butanediol, neopentyl glycol, and 1,6-hexanediol; low-molecular-weight triols such as glycerin, trimethylolpropane, and hexanetriol; and polymer polyols such as polyether polyol, polyester polyol, lactone polyester polyol, and acrylic polyol.

Examples of polyisocyanate compounds for use as raw materials of isocyanate group-terminated urethane prepolymers include, without any particular limitation, aromatic diisocyanates such as 2,4-toluene diisocyanate, 2,6-toluene diisocyanate and a mixture (TDI) of 2,4-tolulene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI) and paraphenylene diisocyanate (PPDI); and alicyclic or aliphatic diisocyanates such as 4,4'-dicyclohexylmethane diisocyanate (hydrogenated MDI), hexamethylene diisocyanate (HDI) and isophorone diisocyanate (IPDI), or mixtures of at least two of them. Among them, TDI or MDI is preferably used because the resulting polyurethane cover has favorable mechanical properties and a golf ball with the resulting polyurethane cover is satisfactory in repulsion property, weatherability and water resistance.

The isocyanate group-terminated urethane prepolymer used in the present invention is obtained by mixing a polyisocyanate and a polyol comprising polycarbonate polyol so that the equivalent ratio of OH group:NCO group ranges from 1.5:1 to 8:1 and allowing them to react with each other.

The free NCO content of the isocyanate group-terminated urethane prepolymer used in the present invention is 3% to 20% by mass, preferably 5% to 15% by mass. Since free NCO becomes a reaction site for reaction with the curing agent, free NCO has a relation with the crosslinking density of the resulting polyurethane. If the free NCO content is less than 3% by mass, the resulting polyurethane is so soft that a cover formed of the polyurethane has a lowered repulsion property. Hence, when a ball with such a cover is hit with a golf club, the ball departs from the club with a delay so that the golfer feels it heavy. If it is more than 20% by mass, the resulting polyurethane is so hard that a golf ball with a cover formed of the polyurethane gives too large an impact to golfers upon a shot though it exhibits an improved repulsion property.

As the curing agent used for curing the urethane prepolymer there may be used any polyol having an alcoholic hydroxyl group, any amine, or a mixture of these without any particular limitation.

Such an amine-type curing agent is preferably an aromatic polyamine having at least two amino groups bonded to an aromatic ring. Examples of such polyamine include 3,3'-dichloro-4,4'-diaminodiphenylmethane, methylenedianiline, a complex of methylenedianiline and sodium chloride, 1,2-bis(2-aminophenylthio)ethane, 3,5-dimethylthio-2,4-toluenediamine, 3,5-dimethylthio-2,6-toluenediamine, trimethylene glycol-di-p-aminobenzoate, and polytetramethyleneoxide-di-p-aminobenzoate. Examples of such polyol-type curing agents include ethylene glycol, diethylene glycol, propylene glycol, 1,4-butanediol, pentanediol, hexanediol, bishydroxybenzene, trimethylolpropane, and pentaerythritol.

Preferably, the polyurethane cover composition used in the present invention is prepared by mixing the curing agent and the isocyanate group-terminated urethane prepolymer together so that the equivalent ratio of the total of the amino group and hydroxyl group contained in the curing agent to the free isocyanate group contained in the isocyanate group-terminated urethane prepolymer, i.e., {(OH+NH$_2$)/NCO} assumes 0.80 to 1.2. Particularly where an isocyanate group-terminated urethane prepolymer having a free NCO content of 3% to 20% by mass is used, it is preferred that a diol or diamine curing agent having a molecular weight of from 50 to 500 be used as the curing agent and that the polyurethane cover composition be prepared by mixing and reacting the isocyanate group-terminated urethane prepolymer with the curing agent so that the equivalent ratio of the amino group or hydroxyl group contained in the diamine or diol or diamine to the free isocyanate group contained in the isocyanate group-terminated urethane prepolymer, i.e., OH/NCO or NH$_2$/NCO, assumes 0.8 to 1.2.

The polyurethane cover composition used in the present invention may contain any conventionally known catalyst for use in a urethane reaction in addition to the isocyanate group-terminated urethane prepolymer and curing agent described above. Examples of the catalysts include monoamines such as triethylamine and N,N-dimethylcyclohexylamine; polyamines such as N,N,N',N'-tetramethylethylenediamine and N,N,N',N'',N''-pentamethyldiethylenetriamine; cyclic diamines such as 1,8-diazabicyclo[5,4,0]-7-undecene (DBU) and triethylenediamine; and tin catalysts such as dibutyltin dilaurylate and dibutyltin diacetate.

As required, the polyurethane cover composition may contain a filler such as barium sulfate, a coloring agent such as titanium dioxide, and other additives such as a dispersant, antioxidant, ultraviolet absorber, light stabilizer, fluorescent material, and fluorescent brightener unless they impair any desired property of an intended golf ball with the resulting cover.

The polyurethane cover may be manufactured by employing any conventionally known process. Typically, the ingredients of the polyurethane cover composition are mixed together using a mixer having a typical stirring ability, and then the resulting polyurethane cover composition is injected into a hemispherical mold holding a core and allowed to cure therein. Though any mixing process may be employed without any particular limitation, it is preferred that the composition be sufficiently stirred by the use of a two-part resin mixing dispenser or the like so as not to entrain air therein.

The polyurethane cover thus manufactured as covering a ball preferably has a Shore D hardness (ASTM D-2240) of from 40 to 63 at a non-dimpled portion thereof. If it is less than 40, the cover is so soft as to lower the scuff resistance as well as the repulsion property of the ball. If it is more than 63, the cover is so hard that the resulting golf ball imparts a harder shot feeling to golfers and exhibits lowered spin performance.

There is no particular limitation on the core used in the golf ball of the present invention. It is possible to use any solid core conventionally used in a multi-piece solid golf ball or any conventional wound core.

The solid core is produced by vulcanizing a core rubber composition comprising a diene rubber such as butadiene rubber, an organic peroxide, and unsaturated carboxylic acid or a metal salt thereof and may be either a single-layered core or a multi-piece core having plural layers. The wound core comprises a core comprising a rubber sphere and rubber thread wound about the rubber sphere. The core has a diameter of 36.8 to 41.8 mm, preferably 37.8 to 41.4 mm.

The golf ball of the present invention is constructed by combining such a core with the aforementioned polyurethane cover. The cover may be single-layered or multi-layered. In the case of a multi-layered cover, it is required that at least one layer thereof consist of the polyurethane cover according to the present invention. Further, the golf ball of the present invention is usually provided with paint finish, a marking stamp and the like to enhance the appearance and commercial value thereof before it is put on the market.

EXAMPLES

Hereinafter, the present invention will be more specifically described by way of examples, which are, in no way, construed as limitative of the present invention.

Measurement and Evaluation Methods

1. Hardness of Golf Ball

The hardness of each golf ball was measured by applying a spring hardness tester D-type prescribed by ASTM-D2240 to a non-dimpled portion of the surface of the golf ball.

2. Initial Repulsion Index

An aluminum cylindrical body having a weight of 198.4 g was allowed to impinge upon each golf ball at a velocity of 45 m/sec. The respective velocities of the cylindrical body and the golf ball before and after the impingement were measured, and the repulsion coefficient of the golf ball was calculated from the respective velocities thus measured and the respective weights of the cylindrical body and golf ball. The measurement was performed five times for each golf ball and the average of the measured values was calculated.

The repulsion coefficient of each golf ball was reduced to an index number assuming that the repulsion coefficient of golf ball No. 1 just manufactured was 100. A greater repulsion index is indicative of a higher repulsion property.

3. Heat Resistance

Each golf ball as manufactured was allowed to stand in an oven at 70° C. for one week and then measured for its repulsion coefficient in conformance with the initial repulsion index measuring method. The repulsion coefficient thus measured was reduced to an index number assuming that the initial repulsion coefficient of golf ball No. 1 just manufactured was 100.

4. Weatherability

Each golf ball as manufactured was subjected to a sunshine weatherometer for 120 hours and then measured for its repulsion coefficient in conformance with the initial repulsion index measuring method. The repulsion coefficient thus measured was reduced to an index number assuming that the initial repulsion coefficient of golf ball No. 1 just manufactured was 100.

5. Water Resistance

Each golf ball as manufactured was allowed to stand in water at 60° C. for one week and then measured for its repulsion coefficient in conformance with the initial repulsion index measuring method. The repulsion coefficient thus measured was reduced to an index number assuming that the initial repulsion coefficient of golf ball No. 1 just manufactured was 100.

6. Shot Feeling

The shot feeling imparted by each golf ball just manufactured was evaluated in the following manner. Ten top-level amateur golfers actually hit each golf ball with a metal head driver W#1. Each golfer judged each golf ball to be good or bad synthetically in view of its impact strength upon a shot and a sensation of repulsion imparted thereby. Each golf ball was rated according to the following rating criteria.

Rating Criteria

Category "○": a golf ball judged to be bad by less than two golfers;
Category "Δ": a golf ball judged to be bad by two to five golfers; and
Category "X": a golf ball judged to be bad by at least six golfers.

Influence of the Polyol Component of a Urethane Prepolymer (1) Manufacture of Solid Core The rubber composition of the formulation shown in Table 1 was subjected to vulcanizing molding at 160° C. for 30 minutes, to form a spherical solid core having a diameter of 40.0 mm.

In Table 1, butadiene rubber is "high-cis polybutadiene BR-01" (cis content: 96%) produced by JSR Corp; zinc acrylate is "ZNDA 90S" produced by NIPPON JYORYU CO.; zinc white is "Zinc white No. 1" produced by Toho Zinc; and dicumyl peroxide is one produced by NOF Corp.

TABLE 1

| Compound | Amount (parts by mass) |
| --- | --- |
| Butadiene rubber | 100 |
| Zinc acrylate | 30 |

TABLE 1-continued

| Compound | Amount (parts by mass) |
|---|---|
| Zinc white | 5 |
| Dicumyl peroxide | 0.5 |

(2) Synthesis of Prepolymer 4,4'-diphenylmethane diisocyanate (produced by Nippon Polyurethane Industry Co.) was mixed with a polycarbonate diol represented by the following formula (produced by UBE Industries), polytetramethylene ether glycol (produced by BASF JAPAN Co.) or poly(ethylene adipate) glycol (produced by Sanyo Chemical Ind.) having respective number-average molecular weight shown in Table 2 so that the equivalent ratio between the NCO group and the OH group (OH/NCO) assumed ¼. The resulting mixture was reacted at 70° C. for three hours in a nitrogen atmosphere while being stirred. Thus, isocyanate group-terminated urethane prepolymers having respective NCO contents (% by mass) and respective number-average molecular weights shown in Table 2 were each synthesized.

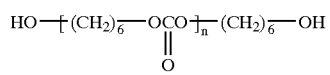

(3) Manufacture of Cover

The isocyanate group-terminated urethane prepolymer thus synthesized was mixed with 1,4-butanediol (produced by BASF JAPAN Co.) so that the equivalent ratio of the hydroxyl group of the curing agent to the isocyanate group of the urethane prepolymer (OH/NCO) assumed 0.95. Further, titanium oxide was added in an amount of 2 parts by mass to 100 parts by mass of the total of the urethane prepolymer and the curing agent, to give a cover composition in a viscous liquid state.

The cover composition thus prepared was injected into a hemispherical mold formed with convex portions for forming dimples in which the previously manufactured core was held, and then this mold was inverted and mated with another hemispherical mold (also formed with convex portions for forming dimples) containing the cover composition injected thereinto, followed by press molding at 80° C. for 15 minutes for the composition to cure.

After the curing, the resulting golf ball was removed from the molds, deburred, and then coated with a white paint and further with a clear paint. In this way, there were obtained golf balls Nos. 1 to 7 each having a diameter of 24.8 mm and a mass of 45.2 to 45.7 g.

Golf ball No. 8 was manufactured in the same manner as with golf ball No. 2 except that Elasmer 250P was used as the curing agent. Elasmer 250P is polytetramethyleneoxide aminobenzoate (amine value: 249.4 mgKOH/g) produced by Ihara Chemical Ind.

According to the evaluation methods described above, each golf ball just manufactured was evaluated as to its hardness, repulsion property and shot feeling. Further, the heat resistance test, weatherability test and water resistance test were conducted on each golf ball according to the evaluation methods described above. The results along with the composition of each urethane prepolymer are shown in Table 2.

TABLE 2

| | Ball No | 1 | 2 | 3 | 4 | 5 | 6 | 7 | 8 |
|---|---|---|---|---|---|---|---|---|---|
| Polyol | Type | PCG | PCG | PCG | PCG | PCG | PTMG | PEAG | PCG |
| | Molecular weight | 994 | 1987 | 633 | 264 | 3282 | 1962 | 2153 | 1987 |
| Prepolymer | NCO content | 8.8 | 8.4 | 8.3 | 8.6 | 8.5 | 8.1 | 8.2 | 8.4 |
| | Molecular weight | 1622 | 2896 | 1089 | 869 | 4020 | 3090 | 3103 | 2896 |
| Curing agent | | 1,4-butanediol | | | | | | | Elasmer 250 P |
| Golf ball Characteristics | Hardness | 55 | 53 | 57 | 59 | 51 | 52 | 53 | 51 |
| | Initial repulsion index | 100 | 98 | 98 | 95 | 96 | 100 | 95 | 97 |
| | Heat resistance | 96 | 95 | 94 | 92 | 92 | 81 | 90 | 94 |
| | Weatherability | 93 | 92 | 90 | 88 | 89 | 79 | 87 | 91 |
| | Water resistance | 92 | 90 | 90 | 85 | 87 | 91 | 76 | 90 |
| | Shot feeling | ○ | ○ | ○ | Δ | ○ | ○ | ○ | ○ |

*Remarks:
PCG: polycarbonate diol
PTMG: polytetramethylene ether glycol produced by BASF JAPAN Co.
PEAG: poly(ethylene adipate) glycol produced by Sanyo Chemical Ind.

Golf ball No. 6 manufactured by using polytetramethylene ether glycol (PTMG) as the polyol component exhibited an initial repulsion index of 100, which was equal to the initial repulsion index of golf ball No. 1 as an example of the present invention. However, the repulsion index of golf ball No. 6 after having undergone any one of the heat resistance test, weatherability test and water resistance test was inferior to that of golf ball No. 1 and, hence, golf ball No. 6 was inferior in repulsion durability. Golf ball No. 7 manufactured using poly(ethylene adipate) as the polyol component exhibited a particularly lowered repulsion index after having undergone the water resistance test.

From comparison among golf balls Nos. 1 to 5 each manufactured using a polycarbonate diol as the polyol component, it was found that the initial repulsion property was lowered when the molecular weight of the polyol component used was too small (golf ball No. 4) or too large (golf ball No. 5). Golf ball No. 4, in particular, exhibited a lowered repulsion property in spite of its increased hardness. Since the polyol component forming a urethane prepolymer is considered to serve as a soft segment, it is conceived that the polyol component is required to have a large molecular weight to a certain extent so as to impart a golf ball with a satisfactory repulsion property.

Influence of the Free NCO Content of a Urethane Prepolymer (1) Manufacture of Solid Core The rubber composition of the formulation shown in Table 1 was subjected to vulcanizing molding at 160° C. for 30 minutes, to form a spherical solid core having a diameter of 40.0 mm.

(2) Preparation of Urethane Prepolymer 4,4'-diphenylmethane diisocyanate (produced by Nippon Polyurethane Industry Co.) was mixed with a polycarbonate diol (produced by UBE Industries) having a number-average molecular weight of 1987 at a equivalent ratio (PCG:MDI) varied as shown in Table 3, to give isocyanate group-terminated urethane prepolymers Nos. 11 to 15 having respective NCO contents (% by mass) and respective number-average molecular weights shown in Table 3.

(3) Manufacture of Cover

Each of the isocyanate group-terminated urethane prepolymers thus synthesized was mixed with 1,4-butanediol (produced by BASF JAPAN Co.) so that the equivalent ratio of the hydroxyl group of the curing agent to the isocyanate group of the urethane prepolymer (OH/NCO) assumed 0.95. Further, titanium oxide was added in an amount of 2 parts by mass to 100 parts by mass of the total of the urethane prepolymer and the curing agent. In this way, cover compositions each in a viscous liquid state were prepared.

In the same manner as golf ball No. 1, golf balls Nos. 11 to 15 were manufactured using each of the cover compositions thus prepared and the core manufactured as described above.

According to the evaluation methods described above, each golf ball just manufactured was evaluated as to its hardness, repulsion property and shot feeling. Further, the heat resistance test, weatherability test and water resistance test were conducted on each golf ball according to the evaluation methods described above. The results along with the composition of each urethane prepolymer are shown in Table 3.

TABLE 3

| Golf ball No | | 11 | 12 | 13 | 14 | 15 |
|---|---|---|---|---|---|---|
| Polyol | Type | PCG | PCG | PCG | PCG | PCG |
| | Molecular weight | 1987 | 1987 | 1987 | 1987 | 1987 |
| PCG:MDI (equivalent ratio) | | 1:4 | 1:2 | 1:3.3 | 1:5.4 | 1:7 |
| Prepolymer | NCO content (%) | 8.4 | 4.8 | 6.1 | 11.8 | 16.3 |
| | Molecular weight | 2896 | 3298 | 2935 | 2738 | 2605 |
| Curing agent | | | | 1,4-butanediol | | |
| Golf ball | Hardness | 53 | 38 | 46 | 58 | 71 |
| Ball characteristics | Initial repulsion index | 98 | 94 | 97 | 102 | 105 |
| | Heat resistance | 95 | 90 | 93 | 96 | 98 |
| | Weatherability | 92 | 88 | 90 | 94 | 92 |
| | Water resistance | 90 | 85 | 89 | 92 | 93 |
| | Shot feeling | ◯ | Δ | ◯ | ◯ | X |

The polyurethane cover finally obtained from a urethane prepolymer having a low free isocyanate content was soft, because presumably it had a lowered crosslinking density due to decreased allophanate bonds or burette bonds. For this reason, the golf ball manufactured using such a urethane prepolymer (No. 12) exhibited an inferior initial repulsion property and imparted a poor shot feeling to the golfers. On the other hand, the initial repulsion property of a golf ball became higher as the free isocyanate content of a urethane prepolymer increased. However, when the free isocyanate content of a prepolymer was more than 15% by mass, the resulting golf ball (No. 15) imparted a bad shot feeling to the golfers and hence was considered to be unsuitable for practical use.

The golf ball of the present invention uses a polycarbonate polyol that is excellent in heat resistance, weatherability and water resistance as a constituent of its polyurethane cover and hence exhibits superior durability and maintains a high repulsion property for a long time.

This application is based on Japanese Application Serial No. 2001-74095 filed in Japan Patent Office on Mar. 15, 2001, the contents of which are hereby incorporated by reference.

While only certain presently preferred embodiments of the present invention have been described in detail, as will be apparent for those skilled in the art, certain changes and modifications may be made in embodiment without departing from the spirit and scope of the present invention as defined by the following claims.

What is claimed is:

1. A golf ball comprising a core, and a thermoset polyurethane cover covering the core, wherein:

the polyurethane cover is formed by curing a urethane prepolymer having an isocyanate group at a terminal thereof with a curing agent;

the urethane prepolymer contains a polycarbonate polyol component having a number-average molecular weight of from 300 to 3000; and the polycarbonate polyol is poly(hexamethylene carbonate) or poly(1,4 cyclohexamethylene carbonate).

2. The golf ball according to claim 1, wherein:

the urethane prepolymer has a free NCO group content of from 5% to 15% by mass; and the curing agent is a diol or a diamine each having a number-average molecular weight of from 50 to 500 and is used in an amount such that the equivalent ratio of the amino or hydroxyl group of the curing agent to the free NCO group of the urethane prepolymer (OH/NCO or NH2/NCO) is from 0.8 to 1.2.

3. The golf ball according to claim 1, wherein the polyurethane cover has a Shore D hardness of from 40 to 63 at a non-dimpled portion thereof.

4. The golf ball according to claim 1, wherein the core is solid core.

5. The golf ball according to claim 4, wherein: the urethane prepolymer has a free NCO group content of from 5% to 15% by mass; and the curing agent is a diol or a diamine each having a number-average molecular weight of from 50 to 500 and is used in an amount such that the equivalent ratio of the amino or hydroxyl group of the curing agent to the free NCO group of the urethane prepolymer (OH/NCO or NH2/NCO) is from 0.8 to 1.2.

6. The golf ball according to claim 4, wherein the polyurethanecover has a Shore D hardness of from 40 to 63 at a non-dimpled portion thereof.

* * * * *